United States Patent
Agrawal et al.

(10) Patent No.: US 10,949,911 B2
(45) Date of Patent: Mar. 16, 2021

(54) COMPUTER PROVIDED ASSISTANCE FOR COORDINATING GIFT COLLABORATION

(71) Applicant: International Business Machines Corporation, Armonk, NY (US)

(72) Inventors: Priyanka Agrawal, Bangalore (IN); Pankaj S. Dayama, Bangalore (IN); Amrita Saha, Bangalore (IN); Srikanth G. Tamilselvam, Chennai (IN); Vikas C. Raykar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 481 days.

(21) Appl. No.: 15/825,273

(22) Filed: Nov. 29, 2017

(65) Prior Publication Data

US 2019/0164217 A1     May 30, 2019

(51) Int. Cl.
| | | |
|---|---|---|
| G06Q 30/00 | (2012.01) | |
| G06Q 30/06 | (2012.01) | |
| G06Q 50/00 | (2012.01) | |
| G06Q 10/10 | (2012.01) | |

(52) U.S. Cl.
CPC ....... *G06Q 30/0633* (2013.01); *G06Q 10/101* (2013.01); *G06Q 10/109* (2013.01); *G06Q 30/0631* (2013.01); *G06Q 50/01* (2013.01)

(58) Field of Classification Search
CPC ................................................. G06Q 30/0633
See application file for complete search history.

(56) References Cited

U.S. PATENT DOCUMENTS

| | | |
|---|---|---|
| 8,910,055 B2 | 12/2014 | Berger |
| 2009/0125396 A1 | 5/2009 | Otto |
| 2009/0125410 A1* | 5/2009 | Perlman ............... G06Q 10/109 705/26.1 |
| 2010/0223155 A1 | 9/2010 | Anderson |
| 2011/0016023 A1 | 1/2011 | Zakas |
| 2011/0057790 A1 | 3/2011 | Martin |

(Continued)

OTHER PUBLICATIONS eDivvy.com offers new B2B payment application for group gifting. (Oct. 5, 2009). Wireless News Retrieved from https://search.proquest.com/docview/210324786?accountid=14753.*

(Continued)

*Primary Examiner* — Kathleen Palavecino
(74) *Attorney, Agent, or Firm* — Michael D. Purdham

(57) ABSTRACT

A computer scans user data for upcoming events and identifies a potential gift giving event from these events using contextual information about the events to determine the events' nature. The computer identifies a plurality of event attendees and analyzes information about two or more of the event attendees. The computer groups a plurality of people into a group of potential gift collaborators, wherein the plurality of people is chosen from the plurality of attendees. The computer generates a first potential gift list. The computer analyzes gift giving abilities of the group members and selects, based partially upon the analysis, a gift giver. The computer generates a second potential gift list with detailed information about one or more potential gifts wherein the gifts are based partially on the first potential gift list. The computer provides at least a portion of the second potential gift list to the selected gift giver.

12 Claims, 5 Drawing Sheets

(56) References Cited

U.S. PATENT DOCUMENTS

2013/0332307 A1   12/2013   Linden
2015/0039464 A1    2/2015   Seetharam
2015/0334168 A1   11/2015   Kosslyn

OTHER PUBLICATIONS

Mell et al., "The NIST Definition of Cloud Computing", National Institute of Standards and Technology, Special Publication 800-145, Sep. 2011, 7 pages.

"Enabling Users to Collaborate on Gifting to Friends", An IP.com Prior Art Database Technical Disclosure, Disclosed Anonymously, IP.com No. IPCOM000236956D, Electronic Publication Date: May 23, 2014, 3 pages, <http://ip.com/IPCOM/000236956>.

* cited by examiner

COMPUTER PROVIDED ASSISTANCE FOR COORDINATING GIFT COLLABORATION

BACKGROUND

Many websites and applications offer recommendations to users for potential purchases. These websites and applications often base these recommendations on a user's profile, their previous purchases, and information regarding similar users.

SUMMARY

Disclosed herein are embodiments of a method, system, and computer program product for coordinating and assisting gift collaboration. A computer scans user data for upcoming events. The computer identifies a potential gift giving event from the upcoming events using contextual information about the upcoming events to determine the nature of the upcoming events. The computer identifies a plurality of attendees of the potential gift giving event. The computer analyzes information about two or more of the plurality of attendees of the potential gift giving event. The computer groups a plurality of people into a group of potential gift collaborators composed of a plurality of group members, wherein the plurality of people is chosen from the plurality of attendees based upon the information of the plurality of attendees. The computer generates a first potential gift list. The computer analyzes a gift giving ability of each of the group members. The computer selects, based at least in part upon the gift giving ability of each of the group members, a gift giver chosen from the plurality of group members. The computer generates a second potential gift list with detailed information about one or more potential gifts on the second potential gift list wherein the one or more potential gifts on the second potential gift list are based at least in part on the first potential gift list. The computer provides at least a portion of the second potential gift list to the selected gift giver, wherein the portion of the second potential gift list includes at least one gift idea.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
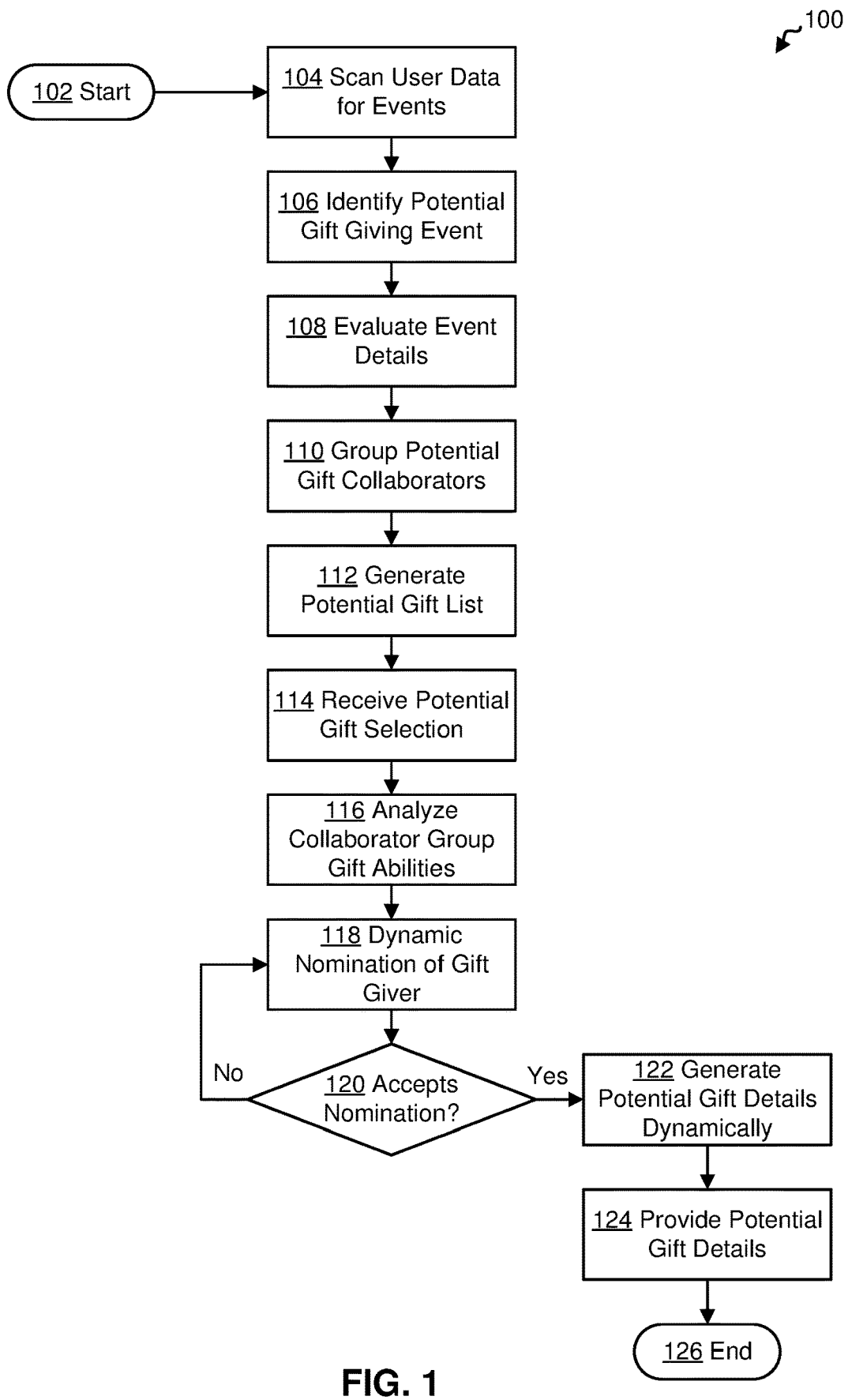
FIG. 1 depicts an example method for providing assistance for gift purchase decision making, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate generally to the field of gift purchasing, and more specifically, to collaborative gift purchasing assistance. While the present disclosure is not necessarily limited to such applications, various aspects of the disclosure can be appreciated through a discussion of various examples using this context.

Embodiments of the present disclosure include a method, system, and computer program product which can be used to facilitate collaborative gift giving. A gift assistance service can scan a user's data including calendar and social media for upcoming events and identify potential events for which gift giving is appropriate or expected. The gift assistance service can evaluate various details about events including the user's relationship to the host and/or gift recipient, the date of the event, the nature of the event, and additional invitees or attendees of the event. The gift assistance service can group potential gift collaborators together to assist them in purchasing one or more gifts together and can generate a potential gift list. The gift assistance service can analyze attributes of the group of gift collaborators including their gift purchasing, selecting, or giving history, their time available for shopping, proximity to stores, and any expertise they may have regarding the potential gifts. The gift assistance service can dynamically nominate a gift giver of the group of gift collaborators to purchase the gift and the nominated gift giver can accept or decline the nomination. The gift assistance service can also generate detailed information on potential gifts dynamically based upon the gift giver's location, stores and store offers near the gift giver, the gift recipient's current belongings, the gift recipient's network's current belongings, the gift recipient's upcoming opportunities to use the gift, style information, and trend information.

Referring now to FIG. 1, depicted is an example method 100 for coordinating and assisting gift collaboration among an ad hoc suggested group of people, in accordance with embodiments of the present disclosure. The following discussion will refer to method 100 being performed by a gift assistance service. It is to be understood that the gift assistance service can be implemented by (and, thus, method 100 performed by) a computer, a collection of computers, one or more virtual machines (including running on a cloud platform), a component of a computer, or firmware or other software running on a computer. Method 100 can include more or fewer operations than those depicted. Method 100 can include operations in different orders than those depicted, including operations occurring simultaneously.

From start 102, method 100 proceeds to operation 104 and a gift assistance service scans user data for events. User data can include a user's calendar, including data collected from calendar applications and email programs used by the user. User data can also include information on a user's accounts on various social media platforms. Such social media platforms can include, but are not limited to, Facebook®, Twitter®, LinkedIn®, Pinterest®, Instagram®, YouTube®, Vine®, Flickr®, Reddit®, Tumblr®, or any similar platform. In some embodiments, a gift assistance service can also scan any messages sent between two people including text messages, phone calls, "Snaps®" using Snapchat®, instant messages, and other messages sent using messaging platforms. The gift assistance service can scan any of these sources for events in a variety of ways, which may depend upon the source of the user data. For example, the gift assistance program may identify entries on calendars, identify events a user has marked as attending on social media, identify emails which refer to events or invitations (including Evites®), identify messages which indicate a date and/or time, or any other way to identify something will be occurring. In some embodiments, a user may input (e.g., through a user application (app), online portal, or a text based message) to the gift assistance service one or more events.

At 106, the gift assistance service identifies a potential event for which gift giving is appropriate or expected. The gift assistance service can use the events identified in operation 104 and use any contextual information about the events to determine the nature of each event and whether such event is appropriate for gift giving. The gift assistance service can gather and use information about gift giving habits of people in general, for example that gifts are commonly given at birthdays, house warming parties, relationship anniversaries, and Christmas, Hanukah, Diwali, or other religious or cultural holidays, in determining whether an event is appropriate for gift giving. Beyond specific religious or cultural holidays, the gift assistance service can also incorporate other religious or cultural information in determining whether gift giving is appropriate or expected for an event, as this can vary by religion and culture. The gift assistance service can also use information about when events are generally not appropriate for gift giving, such as dental appointments and sports games. The gift assistance service can also gather and use information pertaining to an individual user's gift giving habits, such as when a user is more apt to give gifts than other users, or vice versa. In some embodiments, a user may input to the gift assistance service, including through a user application (app), an event for which gift giving is appropriate or expected, or may designate an event which the gift assistance service has identified as such an event. In some embodiments, the gift assistance service can request user input in whether gift giving is appropriate or expected for an identified event. In some embodiments, the gift assistance service can notify a user that an event for which gift giving is appropriate or expected and allow a user to confirm or deny such designation for the event.

At 108, the gift assistance service evaluates various details about events. In various embodiments, the gift assistance service can evaluate varying types of details, in varying depth, and with varying sources of information, including, but not limited to, the specific examples described herein. The amount of detail evaluated at operation 108 can affect the quality of the grouping of gift collaborators at 110 and identification of potential gifts at 112 and 120. Operation 108 can be performed regarding a specific event identified as a potential gift giving event at 106, or in some embodiments, operation 108 can be performed before operation 106 to evaluate further details which may assist in determining whether gift giving is appropriate.

At 108, the gift assistance service can evaluate details including the user's relationship to the host and/or gift recipient, the date of the event, the nature of the event, and additional invitees or attendees of the event. Possible natures of the event can include birthday party, wedding anniversary, graduation party, work promotion celebration, retirement party, or any such description of the reason for the event. The nature of the event can include more detail, such as "grandma's $90^{th}$ birthday party," or "silver (or $25^{th}$) wedding anniversary." The gift assistance service can use the nature of the event when determining potential gifts.

Based upon the source of the event information found in user data at 104, or any other appropriate source, the gift assistance service can determine at 108 a potential gift recipient. In some cases, this can be the host of the event, such as the host of a house warming party. In other cases, it can be the subject of the event, such as the person whose birthday party it is. The gift assistance service can evaluate details regarding the identified gift recipient including the user's type of relationship with the recipient (e.g. friend, coworker, aunt, child, etc.). In some embodiments, the gift assistance service can evaluate a relationship closeness index, which indicates how close the user and the recipient are. A relationship closeness index can be generated using various inputs, including the user data scanned at 104, specifically including messages between the user and recipient and social media interactions (including messages, comments, "likes," etc.) between the user and recipient. The gift assistance service can generate a feature vector representation using any such information and use a resulting confidence score as the relationship closeness index. The gift assistance service can use the type of relationship and/or the relationship closeness index when evaluating potential gifts from the user to the recipient.

Also at 108, the gift assistance service can evaluate additional invitees or attendees of the event. This information may be included with the event information found in the user data at 104, such as the other people an email invitation was sent to or other people invited to a social media event. In some cases, the gift assistance service may be able to ascertain whether these invitees have indicated they will attend the event, such as by marking on social media they will attend or reply messages to the email message with their RSVP indicating they will attend. The gift assistance service can evaluate using any information available, the relationship type and relationship closeness indices between these additional invitees/attendees and the recipients and/or the additional invitees/attendees and the user. If any of these additional invitees/attendees are also users of the gift assistance service, the gift assistance service may have further information from which to make such determinations. The information evaluated on the additional invitees/attendees, and their relationship types and relationship closeness indices can be used by the gift assistance service in determining collaborations between gift givers and potential gifts.

At 110, the gift assistance service groups the user with other potential gift collaborators together to assist them in purchasing and/or giving one or more gifts together. The gift assistance service can use the event details evaluated at 108 in grouping potential gift collaborators, including using the relationship type and relationship closeness indices between these additional invitees/attendees and the recipients and/or the additional invitees/attendees and the user. For example, the gift assistance service can identify a gift giving event of the user's aunt's birthday party and identify additional invitees/attendees of the user's siblings and cousins who share the relationship type of nephew/niece to the user's aunt, as well as additional invitees/attendees for whom the user's aunt is not their aunt. In this example, the gift assistance service can group the user and these other nephews and nieces into a group of potential gift collaborators. This group of people can then purchase one or more gifts together to give to their aunt for her birthday.

In another example, where the event is a going away party for a coworker of the user, with additional coworkers attending, the gift assistance service can group some or all of the coworkers together into a group of potential gift collaborators. In this example, the gift assistance service could additionally or alternatively identify those coworkers who are approximately as close to the coworker recipient as the user, using relationship closeness indices. For example, the user and the recipient (Rita) communicate frequently on social media, coworker John and Rita also communicate frequently on social media, but coworker Ted and Rita do not interact very often. In this example, user and Rita will have a high relationship index, as will John and Rita, but Ted and Rita will have a low relationship index. In this example, the gift assistance service can group user and John into a group of potential gift collaborators, who may want to buy Rita something more personal or more expensive than Ted will be interested in buying Rita, due to their relative relationship levels.

The gift assistance service can also utilize any budget information it has for the user and additional invitees/attendees in grouping potential gift collaborators. People with similar budget ranges can be grouped together to allow for an equal (or substantially equal) cost sharing. In some embodiments, the gift assistance service can also request budget information from the user and/or additional invitees/attendees to use in creating groups. The gift assistance service can also incorporate historical gift giving information, including historical budgets, it has for the user and additional invitees/attendees in grouping potential gift collaborators.

In some embodiments, the gift assistance service can also request other data, including group suggestions, from the user and/or additional invitees/attendees to use in creating groups. In some embodiments, the gift assistance service can prompt one or more users for approval of group of potential gift collaborators, and in the event the group is not approved, create one or more alternative groups. In some embodiments, the gift assistance service can suggest or require that potential gift collaborators register with the gift assistance service or otherwise become users, which may include providing the gift assistance service with additional information or access to social media accounts for further analysis and use in method 100.

At 112, the gift assistance service generates a potential gift list. In various embodiments, the gift assistance service can generate the potential gift list using various methods and various sources and types of information, including, but not limited to, the specific examples described herein. At this operation of method 100, the potential gift list can include broad categories of potential gifts or it can include more narrow gift selections, and this may vary in embodiments. For example, the potential gift list created at 112 can include varying levels of detail of a potential gift, such as: clothing, shirt, or formal shirt.

The gift assistance service can generate a potential gift list using the event details evaluated at 108, including the nature of the event or any suggested gift ideas included in the event details. For example, the gift assistance service can use a wedding registry included within the event details or linked to the event details when generating the potential gift list. In another example, the gift assistance service can use the event nature of a relationship anniversary and include items in the potential gift list of chocolates and flowers. Such suggested items based upon the nature of the event can be derived using historical gift information regarding gifts the user, or users in general, have given or received at similar events. Religious or cultural information relating to gifts given at certain events may also be used by the gift assistance service in generating a potential gift list.

In some embodiments, the gift assistance service can use information about the gift recipient when generating a potential gift list, including the gender, age, known likes or dislikes, or any other information about the gift recipient which the gift assistance service has available to it. This information about the gift recipient can be compared with users or past gift recipients in determining potential gift items. Additionally, the relationships of the members of the group of potential gift collaborators to the gift recipient and any relationship closeness indices between the members of the group of potential gift collaborators and the gift recipient can be used by the gift assistance service in constructing a potential gift list. For example, a potential gift list from a group of coworkers to another coworker may include items such as coffee mugs, pens, and office decorations, while a potential gift list from a group of close friends may include items such as clothing, purses or other accessories, and alcohol.

In some embodiments, the gift assistance service can accept input from the user or group of potential gift collaborators for gift ideas to include on the potential gift list, or a potential gift idea to replace a list of suggestions. In some embodiments, the gift assistance service can use any known budget information for the user, suggested budget information derived from the event details, or any other information indicating an appropriate price, in generating the potential gift list.

At 114, the gift assistance service can receive a potential gift selection from the user and/or the other members of group of potential gift collaborators. This can occur after the gift assistance service provides the user and/or the other members of the group of potential gift collaborators with the potential gift list generated at 112. In some embodiments, the gift assistance service can send the user and/or the other members of the group of potential gift collaborators a prompt to select one item from the potential gift list. In some embodiments, the selection can occur through a voting system whereby each member of the group of potential gift collaborators selects an item and the item with the most selections is chosen.

At 116, the gift assistance service analyzes the members of the group of potential gift collaborators' gift giving abilities. Gift giving ability as used herein can refer to gift selection, gift purchasing, gift presentation, gift delivery, and/or any other aspect of the gift giving process. This analysis can be related to the event, the recipient of the gift, the potential gift(s) selected, or any other feature of the gift giving situation. This analysis can include the gift giving history of the members of the group of potential gift collaborators, including previous gifts selected, purchased, or given using the gift assistance service. The gift giving history may also include in some embodiments analysis of reactions on social media to gift(s) given, which the gift assistance service may monitor after conclusion of previous uses of method 100, or may search for during this analysis. In some embodiments, the gift assistance service may also seek feedback from users regarding gift(s) given or input during this analysis from users about the gift giving abilities of the group of potential gift collaborators.

In some embodiments, the analysis can also include comparing each member's time available for shopping. This information may be determined based upon calendar or scheduling information regarding the members of the group, or can be input to the gift assistance service. Members of the group with more time available to shop for the gift(s) may be ranked higher or be more likely to be chosen as the gift giver.

In some embodiments, the analysis of the members of the group of potential gift collaborators' gift giving abilities can include determining if any of the members have particular expertise relevant to the selected potential gift(s). For example, if one member of the group is a fashion expert and one or more potential gifts are a pair of slacks, this member may be ranked higher or be more likely to be chosen as the gift giver. Determinations of expertise may be made with any available information to the gift assistance service. In various embodiments, this can include analyzing social media posts of users or the members of the groups for frequent posts on certain topics, types of stores frequented by members of the group, profiles created with the gift assistance service, or information otherwise provided to the gift assistance service.

In some embodiments, the analysis of the members of the group of potential gift collaborators' gift giving abilities can include determining if any of the members have accounts (including rewards programs) or memberships with one or more stores relevant to the selected potential gift(s). This can also include online accounts with a website associated with such store(s). This analysis can also include determining whether such accounts or memberships provide the member with shopping advantages (e.g., discounts, free shipping, faster shipping, rewards points, members-only products). For example, if a member of the group has a membership with an online bookseller which provides the member with free two-day shipping, that member may be higher rated if the selected potential gift(s) are books or other items sold by such bookseller.

At 118, the gift assistance service can dynamically nominate one or more gift givers of the group of gift collaborators to purchase the gift(s). The term gift giver as used herein can refer to a person who selects, purchases, delivers, and/or otherwise is more involved in the gift giving process than the other group members. This nomination can utilize the analysis performed during operation 116. Additionally, the gift assistance service can use additional information including the location of the members of the group of gift collaborators, locations of stores, current offers at stores (including online, such as at store websites), or any other information which may be used to identify one or more gift givers to purchase the gift(s). In some embodiments, locations of members and locations of stores may be disregarded by the gift assistance service (or be given lower importance), including in embodiments where one or more members of the group have online accounts or memberships with one or more stores relevant to the selected potential gift(s), where the nominated gift giver may purchase the gift(s) online instead of at a physical store.

Locations of the members of the group can be general locations including by city or region, where a member who lives in a city is more likely to be nominated as a gift giver to purchase the gift(s) due to proximity to stores or shopping areas. Locations of the members of the group can also be more detailed, including global positioning system (GPS) coordinates acquired by monitoring one or more devices associated with members. Locations can also be associated with members due to the content of their social media posts or other communications, including text, images, or video identifying a location. Another way which a member can be associated with a location is by use of identifiers, such as hashtags, which contain location identifying information. For example, members which post using "#downtownmpls" can be associated with the downtown area of Minneapolis, Minn. Various social media platforms have features which can be associated with locations, including events, groups, circles, or other features which may be location specific and the gift assistance service can identify such features used by members in associating members with a location. For example, members which are part of a group associated with an employer can be inferred to be located near the location of the employer. Many alternative ways of identifying a member's location can exist and can include an IP address used by devices of the member, an estimated location of a member based upon recent internet searching, or any other suitable means. The way the gift assistance service determines member's locations will vary in embodiments depending on the information available to the gift assistance service.

The locations of members of the group can be compared to store locations, which can be saved in a database or otherwise known to the gift assistance service. The gift assistance service can also determine or have information regarding the types of goods or services available at each store, or more detailed information regarding the goods or services available. The gift assistance service can use this information to determine which member or members of the group are located near store(s) which sell the selected potential gift(s). The gift assistance service can also use information on current offers or sales occurring at stores, and use this information to nominate members of the group near store(s) which may have the selected potential gift(s) on sale or discounted. The gift assistance service can prioritize a member's gift giving abilities (including gift selection expertise) over their proximity to stores or offers at stores, or vice versa.

In some embodiments, the gift assistance service can monitor this information in real time to continually (or periodically) determine the most suitable gift giver(s). Depending on the locations of the members of the group at any given time, the most suitable gift giver(s) could change. The gift assistance service can dynamically nominate one or more gift giver(s) and change the nomination(s) until one or more member(s) of the group accept nomination(s) to be the gift giver(s).

At 120, the gift assistance service determines whether one or more nominated gift giver(s) have accepted nomination(s) to be the gift giver(s). If no members have accepted nomination(s), method 100 can return to operation 118 to nominate another member of the group to be the gift giver. If one or more nominated gift giver(s) have accepted nomination(s) to be the gift giver(s), method 100 proceeds to operation 122.

At 122, the gift assistance service generates potential gift details dynamically. These potential gift details can include detailed information on potential gifts based upon the gift giver's location, stores and store offers near the gift giver, the gift giver's gift giving abilities (including any relevant selection expertise), the gift recipient's current belongings, the gift recipient's network's current belongings, the gift recipient's upcoming opportunities to use the gift, style information, and trend information. The amount of information available to the gift assistance service can vary in embodiments and correspondingly, the generation of potential gift details will vary in embodiments.

In some embodiments, the gift assistance service can use information regarding the gift giver's location and stores and store offers near the gift giver, including information used in operation 118. In operation 122, some or all of this information can be used to identify particular potential gift ideas with corresponding details. For example, if the gift giver is located near a clothing store with a sale on women's shirts, which was the selected potential gift, the gift assistance service can identify specific women's shirts for sale at that store and collect detailed information on the identified shirts. These specific items can be identified using websites, social media, catalogs, databases, or any other repository of information regarding a store's products. Detailed information regarding the potential gifts will vary depending on the nature of the potential gifts. Continuing the women's shirts example, details can include the color, fabric, any patterning (striped, checkered, etc.), sizes available, brand names, and/or pictures of the shirts. In another example, if the potential gift is a vase, details on vases can include the shape, size, material, color, maker/designer, and/or pictures of the vases. Depending on the gift giver's current location and current stores/store offers, the potential gift item details can be updated dynamically to provide current information to the gift giver until one or more gifts are purchased or chosen.

In some embodiments, the gift assistance service can generate additional details including style information, trend information, ratings information, or previous purchaser comments. This information can come from various sources in various embodiments, including comment or rating areas of store webpages where visitors have commended or rated the product or service, consumer or product reviewing companies or websites, social media information, or user feedback provided to the gift assistance service. The gift assistance service can collect or create information regarding how stylish potential gifts are or whether particular features of a potential gift are trending, and this information can be stored or presented in various formats, including a numerical rating. Social media posts can be analyzed by the gift assistance service to determine how many people or what percentage of people have "liked" or commented on pictures which include the potential gifts or similar potential gifts.

In some embodiments, the gift assistance service can generate additional details using social media information specific to the gift recipient. The gift assistance service can collect and analyze pictures or other social media posts from the gift recipient, about the gift recipient, or in which the gift recipient was "tagged" or otherwise linked to the pictures or other social media posts. Pictures can be analyzed using any of a variety of image similarity or image matching techniques. Additionally, the gift assistance service can collect and analyze this information for members of the gift recipient's social network when available. In some embodiments, social media information relating to the user and/or the gift giver can be used additionally or instead of regarding the gift recipient, including if social media information regarding the gift recipient is unavailable.

Using this social media information, the gift assistance service can identify whether the gift recipient already has a potential gift (or a similar item), whether members of the gift recipient's social network have the potential gift (and if so, how many or what percent have it), and whether a potential gift is compatible with items the gift recipient owns. If the gift recipient already has one or more similar items, the gift assistance service can determine an item which matches most closely for use in the analysis. For an example analysis, if the gift assistance service has identified a potential gift idea of a pink shirt, the gift assistance service can determine if the gift recipient already owns that pink shirt (or a pink shirt), whether the gift recipient's friends own that pink shirt (and if so, how many), and whether the gift recipient has pants or accessories which will pair well with the pink shirt.

The gift assistance service can use this information in selecting or ranking potential gift ideas through various means. For example, if the gift recipient already owns the pink shirt in question, the potential gift can be ranked very low or removed from consideration, but if the gift recipient already owns another pink shirt, but not the pink shirt in question, it can be ranked lower than a purple shirt that the gift recipient does not have. For another example, if two people in the gift recipient's social network already own the pink shirt, it can be given a uniqueness score, which can be expressed as a percentage of the gift recipient's social network or in any other suitable form, with a more unique potential gift being selected over or ranked higher than a potential gift already owned by many within the gift recipient's social network. In some embodiments, a uniqueness score can include similar items and/or can include a similarity score of how similar items owned by members of the gift recipient's social network are to the potential gift. In some embodiments, a uniqueness score can be a weighted average of a combination of a similarity score and a relationship closeness index between the gift recipient and the person who has a similar item. In some embodiments, a uniqueness score can have the opposite effect, which may result from a potential gift being something that is a status symbol that a person would not want to go without. For example, children's toys may be something where a child wishes to have the same toys as their friends, and as such, uniqueness is undesirable. In another example, if the gift recipient has three pairs of pants and a handbag which would be compatible with a pink shirt, it may be selected or ranked higher than a shirt which is compatible with only one skirt.

Using this social media information, or any other information about the gift recipient's upcoming schedule or events, the gift assistance service can identify potential opportunities to use the gift. This identification can take into account the types of events, the guests for the events, and whether repetition of use of the item at the events is desirable. For example, continuing with the pink shirt example, the gift assistance service can detect that the gift recipient will be going to 2 parties in the next month, which the dress code of the party would allow wearing a pink shirt. The gift assistance service can compare this with another potential gift of a more formal white shirt and use information that the gift recipient will be going to 4 work functions in the next month which the gift recipient could wear the formal white shirt at, to select or rank higher the formal white shirt. In some embodiments, the gift assistance service can analyze guest lists, invitees, or attendees for these upcoming opportunities to use gifts in determining whether the potential gifts can be used at all of them. For example, if the 4 work functions will all involve the same coworkers, the gift recipient may not want to wear the same shirt at all 4 work functions and the gift assistance service can adjust the number of potential opportunities to use the gift accordingly.

At 124, these potential gift details can be provided to the gift giver in various forms and levels of detail in various embodiments. In some embodiments, these potential gift details can be provided to the gift giver by sending them to the gift giver through an app, by displaying them on a screen connected to a computer system, by email, by mail, or by any other suitable means. In some embodiments, the gift assistance service can provide a ranked list of a set number (e.g. top 3 list or top 10 list) of potential gifts from which the gift giver can choose. In some embodiments, the gift assistance service can provide with the list of potential gifts some or all of the potential gift details used in the analysis, including e.g. the trend information, the style information, the uniqueness, etc. These potential gift details can be updated as changes occur in location, stores, store offers, trend information, social media information, or any other information used in the analyses. In some embodiments, operations 122 and 124 can repeat until one or more gifts are chosen or purchased, or until the gift giver informs the gift assistance service that potential gifts ideas are no longer desired. After providing potential gift details at 124, method 100 ends at 126.

Figure 2:
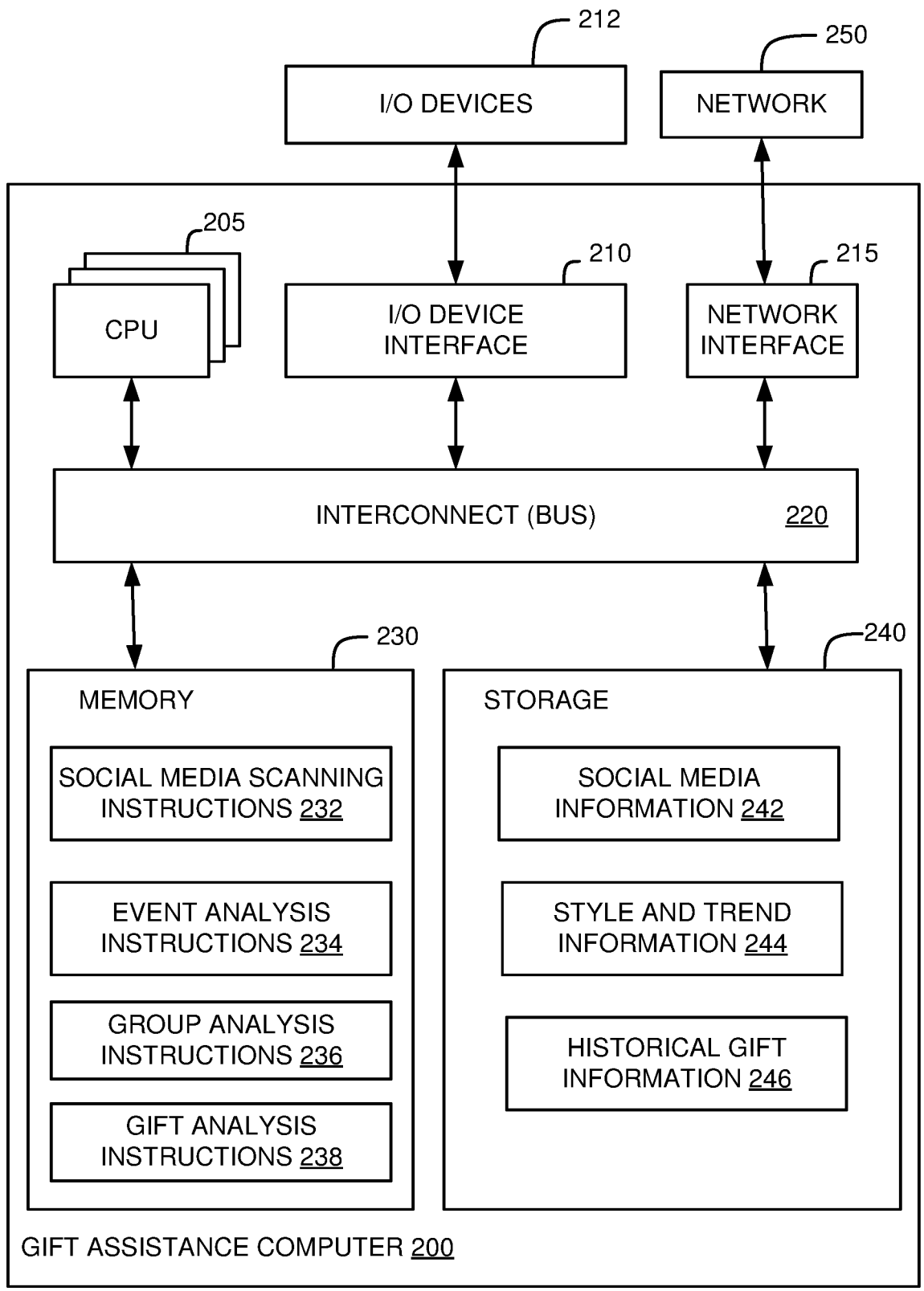
FIG. 2 illustrates a block diagram of an example gift assistance computer, in accordance with some embodiments of the present disclosure.

Referring now to FIG. 2, illustrated is a block diagram of an example gift assistance computer 200, in accordance with some embodiments of the present disclosure. In some embodiments, gift assistance computer 200 performs one or more operations in accordance with FIG. 1 as described above. The gift assistance computer 200 can include one or more processors 205 (also referred to herein as CPUs 205), an I/O device interface 210 which can be coupled to one or more I/O devices 212, a network interface 215, an interconnect (e.g., BUS) 220, a memory 230, and a storage 240. In some embodiments, gift assistance computer 200 can be a virtual machine which uses a portion of one or more CPUs 205, a portion of memory 230, and a portion of storage 240 or otherwise shares resources.

In some embodiments, each CPU 205 can retrieve and execute programming instructions stored in the memory 230 or storage 240. The interconnect 220 can be used to move data, such as programming instructions, between the CPUs 205, I/O device interface 210, network interface 215, memory 230, and storage 240. The interconnect 220 can be implemented using one or more busses. Memory 230 is generally included to be representative of a random access memory (e.g., static random access memory (SRAM), dynamic random access memory (DRAM), or Flash). In some embodiments, the memory 230 can be in the form of modules (e.g., dual in-line memory modules).

The storage 240 is generally included to be representative of a non-volatile memory, such as a hard disk drive, solid state device (SSD), removable memory cards, optical storage, or flash memory devices. In an alternative embodiment, the storage 240 can be replaced by storage area-network (SAN) devices, the cloud, or other devices connected to the gift assistance computer 200 via the I/O devices 212 or a network 250 via the network interface 215.

The CPUs 205 can be a single CPU, multiple CPUs, a single CPU having multiple processing cores, or multiple CPUs with one or more of them having multiple processing cores in various embodiments. In some embodiments, a processor 205 can be a digital signal processor (DSP). The CPUs 205 can additionally include one or more memory buffers or caches (not depicted) that provide temporary storage of instructions and data for the CPUs 205. The CPUs 205 can be comprised of one or more circuits configured to perform one or more methods consistent with embodiments of the present disclosure.

The memory 230 of gift assistance computer 200 includes social media scanning instructions 232, event analysis instructions 234, group analysis instructions 236, and gift analysis instructions 238. In some embodiments, these instructions individually or together perform one or more operations in accordance with FIG. 1 as described above.

Social media scanning instructions 232 can be processor-executable instructions for scanning social media for events, event details, information regarding items owned by gift recipients, or any other social media information useable by the gift assistance computer. Social media scanning instructions 232 can contain instructions for scanning the social media of the users of the gift assistance service, social media of an identified gift recipient, social media of a group of gift collaborators identified by the gift assistance service, all social media for a particular platform, social media located within a country or region, or can otherwise contain instructions governing the social media which to scan.

Event analysis instructions 234 can be processor-executable instructions for identifying potential gift giving events and evaluating details regarding events. Event analysis instructions 234 can vary in embodiments depending on the sources of user data where events may be found, including scanned social media, user email accounts, calendar services or applications, or any other source of user data. Event analysis instructions 234 can include instructions for determining which events are appropriate for gift giving or where gift giving is expected. Event analysis instructions 234 can also include instructions for evaluating event details including a user's relationship to the host of an event and/or a gift recipient, the date of the event, the nature of the event, and additional invitees or attendees of the event.

Group analysis instructions 236 can be processor-executable instructions for grouping a user with potential gift collaborators to purchase one or more gifts together and/or for evaluating which member of a group of potential gift collaborators should be the gift giver. Group analysis instructions 236 can include instructions for using relationship types and relationship closeness indices between people invited to or attending an event and the recipient of the one or more gifts and/or between the people invited to or attending an event and the user. Additionally, group analysis instructions can include budget information or historical gift giving information about any of these people or users. Group analysis instructions 236 can include instructions for analyzing various details about the grouped collaborators including their locations, time constraints for shopping, expertise in purchasing identified gifts, their gift giving history, or any other relevant information.

Gift analysis instructions 238 can be processor-executable instructions for identifying broad categories of gifts, identifying specific gifts, and/or evaluating details regarding gifts. Gift analysis instructions 238 can include instructions for analyzing types of gifts given at events, details about gift recipients including the gender, age, known likes or dislikes, or any other information about the gift recipient, or any other relevant information. Gift analysis instructions 238 can include instructions for analyzing the gift giver's location, stores and store offers near the gift giver, the gift recipient's current belongings, the gift recipient's network's current belongings, the gift recipient's upcoming opportunities to use the gift, style information, and trend information.

Storage 240 contains social media information 242, style and trend information 244, and historical gift information 246. In some embodiments, this information can be used individually or together in the performance of one or more operations in accordance with FIG. 1 as described above.

Social media information 242 can be information obtained by the gift assistance computer 200 through varying means and for varying purposes in embodiments. Social media information 242 can be obtained using social media scanning instructions 232. Social media information 242 can include information scanned for to determine users' events and potential gift giving events. Social media information 242 can also include information from social media platforms analyzed to evaluate event details. Social media information 242 can include information regarding items owned by gift recipients, items owned by members of gift recipients' social networks, or any other social media information useable by the gift assistance computer.

Style and trend information 244 can vary in embodiments and can depend on the source of the style and trend information. In some embodiments, the gift assistance computer 200 can store style and trend information 244 from each time the gift assistance computer generates potential gift details including specific style and trend information regarding specific potential gifts. In some embodiments, the gift assistance computer 200 can obtain style and trend information from outside sources include store websites, review websites or review organizations, social media "likes" and comments regarding potential gifts, or any other source of information regarding styles or trends.

Historical gift information 246 can vary in embodiments. In some embodiments, gift assistance computer 200 can save information regarding potential gift ideas and potential gift details for use in providing future gift assistance. In some embodiments, gift assistance computer 200 can store or access as historical gift information 246, information regarding users' or gift collaborators' gift giving habits, expertise, preferences, budgets, or any other such information, which may be used in grouping collaborators or selecting potential gifts.

In some embodiments as discussed above, the memory 230 stores social media scanning instructions 232, event analysis instructions 234, group analysis instructions 236, and gift analysis instructions 238, and the storage 240 stores social media information 242, style and trend information 244, and historical gift information 246. However, in various embodiments, each of the social media scanning instructions 232, event analysis instructions 234, group analysis instructions 236, gift analysis instructions 238, social media information 242, style and trend information 244, and historical gift information 246 are stored partially in memory 230 and partially in storage 240, or they are stored entirely in memory 230 or entirely in storage 240, or they are accessed over a network 250 via the network interface 215.

In various embodiments, the I/O devices 212 can include an interface capable of presenting information and receiving input. For example, I/O devices 212 can receive input from an administrator and present information to an administrator and/or a device interacting with gift assistance computer 200.

Logic modules throughout the gift assistance computer 200—including but not limited to the memory 230, the CPUs 205, and the I/O device interface 210—can communicate failures and changes to one or more components to a hypervisor or operating system (not depicted). The hypervisor or the operating system can allocate the various resources available in the gift assistance computer 200 and track the location of data in memory 230 and of processes assigned to various CPUs 205. In embodiments that combine or rearrange elements, aspects and capabilities of the logic modules can be combined or redistributed. These variations would be apparent to one skilled in the art.

Figure 3:
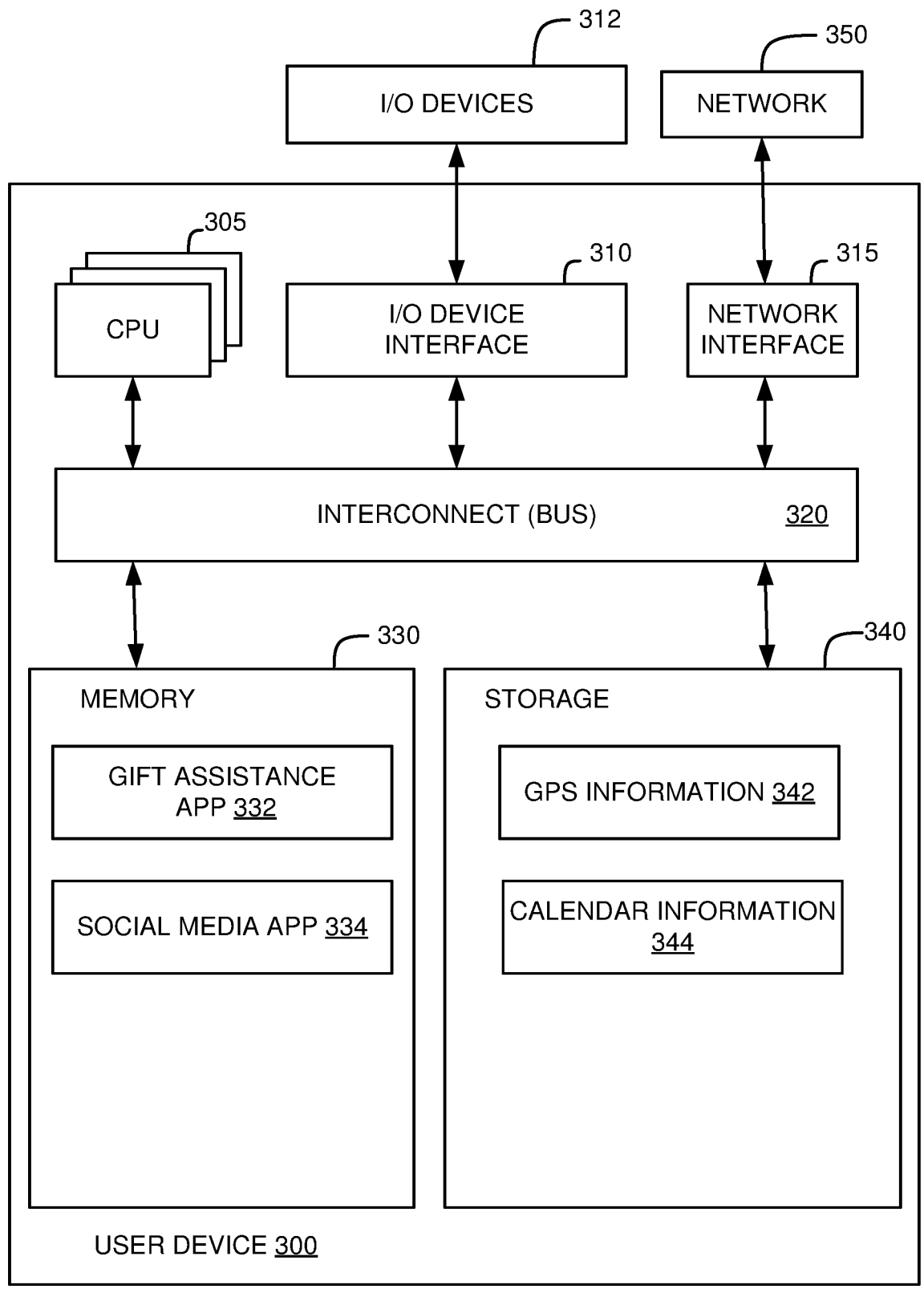
FIG. 3 illustrates a block diagram of an example user device, in accordance with some embodiments of the present disclosure.

Referring now to FIG. 3, illustrated is a block diagram of an example user device 300, in accordance with some embodiments of the present disclosure. In some embodiments, user device 300 performs one or more operations in accordance with FIG. 1 as described above. The user device 300 can include one or more processors 305 (also referred to herein as CPUs 305), an I/O device interface 310 which can be coupled to one or more I/O devices 312, a network interface 315, an interconnect (e.g., BUS) 320, a memory 330, and a storage 340. One or more components depicted in FIG. 3 can be combined or replaced by a microcontroller. Such microcontroller can, for example, contain one or more CPUs, memory, and programmable input/output peripherals. In embodiments employing a microcontroller, the discussion of the various components of user device 300 can apply instead to corresponding aspects of the microcontroller when applicable. In some embodiments, user device 300 can be a virtual machine which uses a portion of one or more CPUs 305, a portion of memory 330, and a portion of storage 340 or otherwise shares resources.

In some embodiments, each CPU 305 can retrieve and execute programming instructions stored in the memory 330 or storage 340. The interconnect 320 can be used to move data, such as programming instructions, between the CPUs 305, I/O device interface 310, network interface 315, memory 330, and storage 340. The interconnect 320 can be implemented using one or more busses. Memory 330 is generally included to be representative of a random access memory (e.g., static random access memory (SRAM), dynamic random access memory (DRAM), or Flash). In some embodiments, the memory 330 can be in the form of modules (e.g., dual in-line memory modules).

The storage 340 is generally included to be representative of a non-volatile memory, such as a hard disk drive, solid state device (SSD), removable memory cards, optical storage, or flash memory devices. In an alternative embodiment, the storage 340 can be replaced by storage area-network (SAN) devices, the cloud, or other devices connected to the user device 300 via the I/O devices 312 or a network 350 via the network interface 315.

The CPUs 305 can be a single CPU, multiple CPUs, a single CPU having multiple processing cores, or multiple CPUs with one or more of them having multiple processing cores in various embodiments. In some embodiments, a processor 305 can be a digital signal processor (DSP). The CPUs 305 can additionally include one or more memory buffers or caches (not depicted) that provide temporary storage of instructions and data for the CPUs 305. The CPUs 305 can be comprised of one or more circuits configured to perform one or more methods consistent with embodiments of the present disclosure.

The memory 330 of user device 300 includes gift assistance app 332 and social media app 334. Gift assistance app 332 can be an application running in memory 330 which receives information from a gift assistance service. Gift assistance app 332 can serve as a portal for users to enter information to a gift assistance computer such as gift assistance computer 200, to enter events or gift giving events, confirm events are gift giving events, propose or accept groups of potential gift collaborators, approve or select potential gift ideas, accept or decline gift giving nominations, provide budget or other information to the gift assistance service, or otherwise interact with the gift assistance service. Gift assistance app 332 can also receive various communications from the gift assistance service.

Social media app 334 can be an application running in memory 330 which a user uses to access social media or to provide the gift assistance service with access to the user's social media information. Many social media platforms off an app to access their service which can be social media app 334. In some embodiments, a user may use an internet browser or other means for accessing social media and/or allowing the gift assistance service access to the user's social media information.

Storage 340 contains GPS information 342 and calendar information 344. GPS information 342 can be GPS coordinates of the user device which are created in real time or can be stored information about previous GPS coordinates of the user device. GPS information 342 can also include GPS coordinates of locations where the user of user device 300 frequents. GPS information 342 can be transmitted to the gift assistance service for use in various aspects of providing gift giving assistance, including grouping potential gift collaborators, analyzing collaborators' gift giving abilities, nominating a gift giver, and/or generating potential gift details.

Calendar information 344 can be information stored in a calendar application stored locally on user device 300. In some embodiments, calendar information 344 can be or include information stored remotely, such as in an email calendar application, which may have local copies of calendar data stored on user device 300. Calendar information 344 can be accessed by, sent to, and/or used by a gift assistance service and/or a gift assistance app 332 in identifying a user's events and/or identifying potential gift giving events. Calendar information 344 can also be used by a gift assistance service and/or a gift assistance app 332 in determining potential opportunities for a gift recipient to use a potential gift, which can be a part of generating potential gift details.

In some embodiments as discussed above, the memory 330 stores gift assistance app 332 and social media app 334, and the storage 340 stores GPS information 342 and calendar information 344. However, in various embodiments, each of the gift assistance app 332 and social media app 334, GPS information 342 and calendar information 344 are stored partially in memory 330 and partially in storage 340, or they are stored entirely in memory 330 or entirely in storage 340, or they are accessed over a network 350 via the network interface 315.

In various embodiments, the I/O devices 312 can include an interface capable of presenting information and receiving input. For example, I/O devices 312 can receive input from a user and present information to a user and/or a device interacting with user device 300.

Logic modules throughout the user device 300—including but not limited to the memory 330, the CPUs 305, and the I/O device interface 310—can communicate failures and changes to one or more components to a hypervisor or operating system (not depicted). The hypervisor or the operating system can allocate the various resources available in the user device 300 and track the location of data in memory 330 and of processes assigned to various CPUs 305. In embodiments that combine or rearrange elements, aspects and capabilities of the logic modules can be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
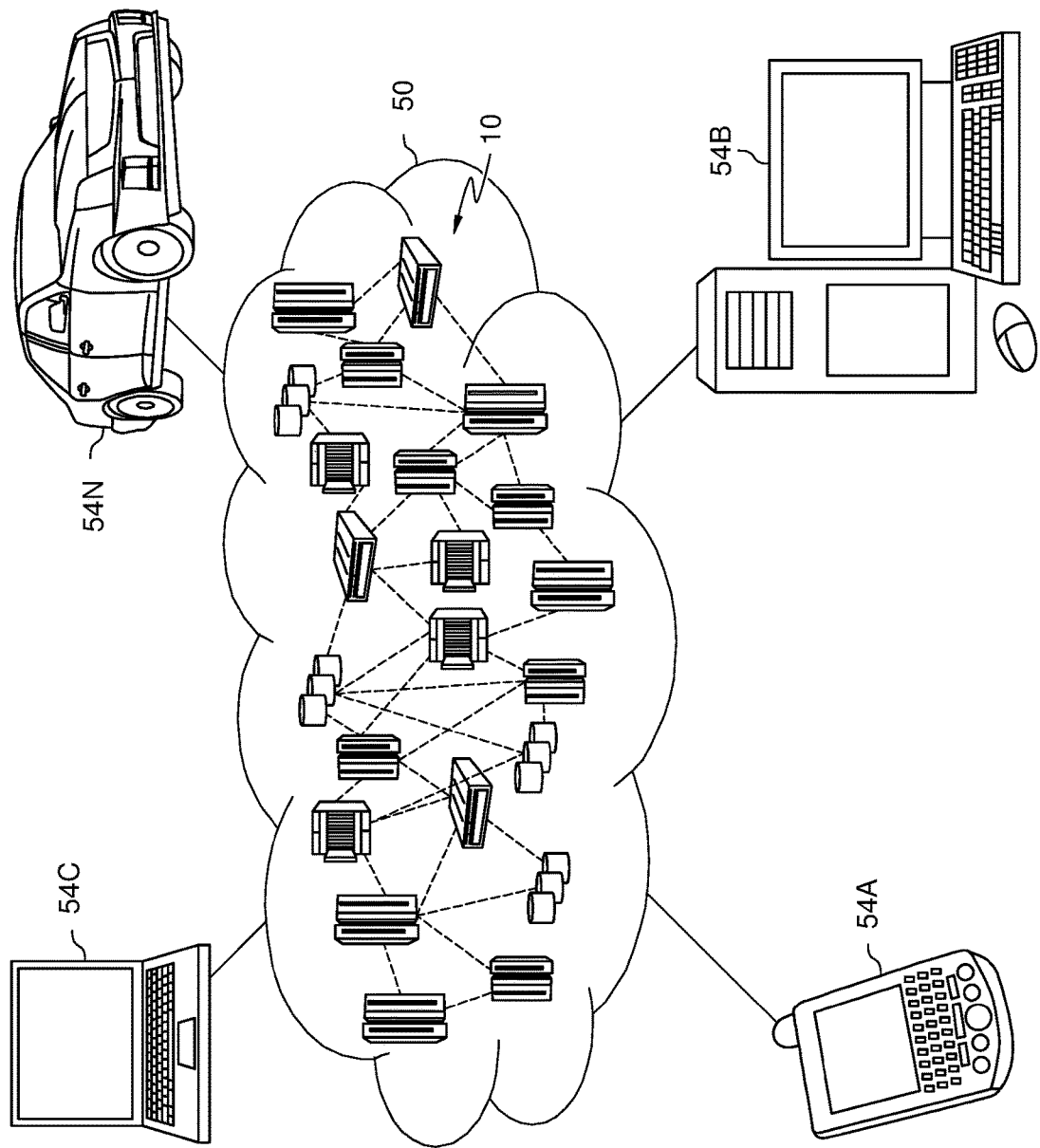
FIG. 4 depicts a cloud computing environment according to an embodiment of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
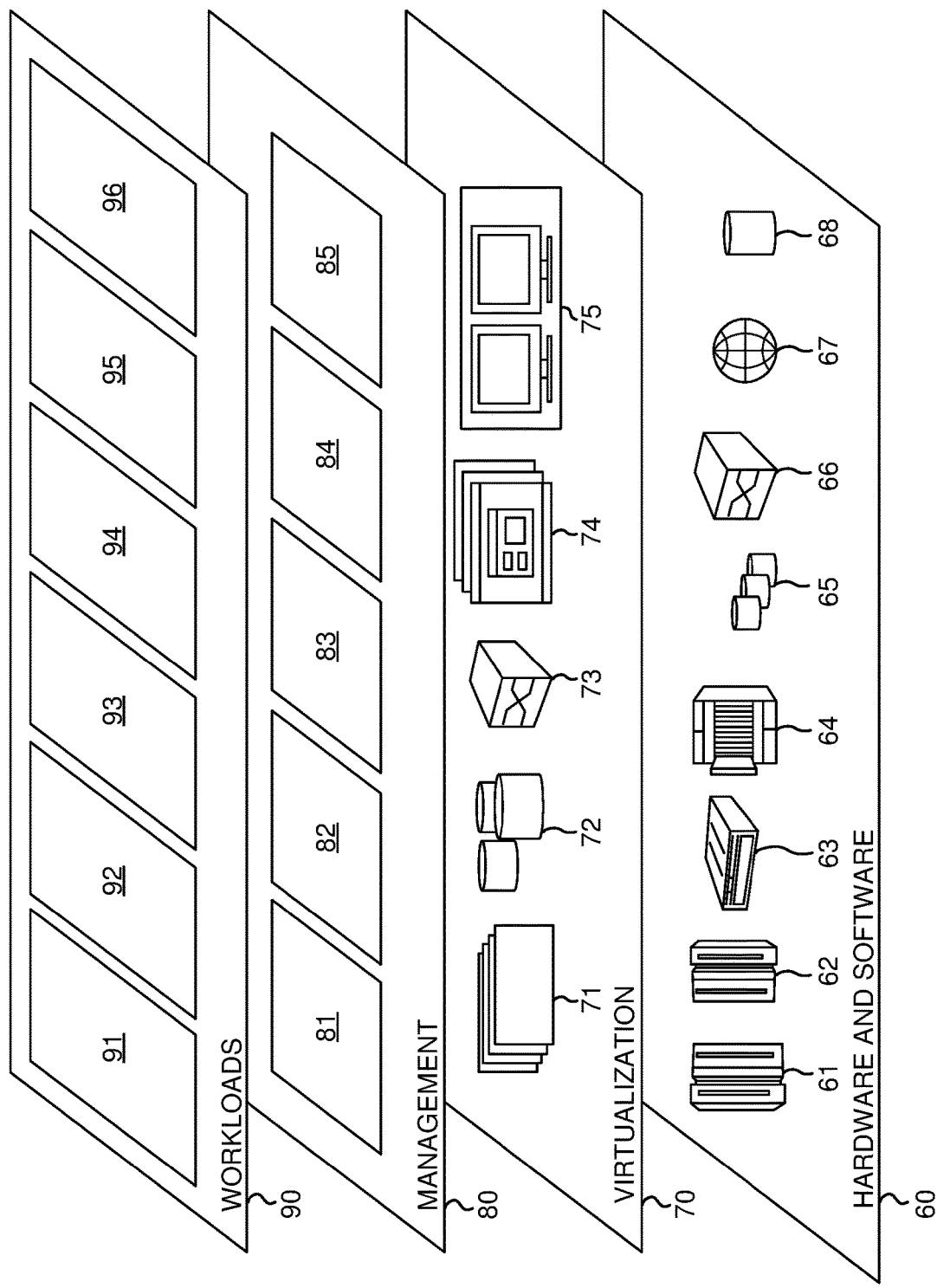
FIG. 5 depicts abstraction model layers according to an embodiment of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components.

Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and gift assistance provision 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for coordinating and assisting resource collaboration, the method comprising:
    scanning, by a computer system, a plurality of disparate sources to retrieve user data for upcoming events, wherein the plurality of sources includes a remote calendaring application, social media accounts, emails, and electronic messages;
    identifying, by the computer system, a potential resource providing event from the upcoming events using contextual information about the upcoming events to determine the nature of the upcoming events;
    identifying, by the computer system, a plurality of resource providers associated with the potential resource providing event;
    analyzing, by the computer system, information about two or more of the plurality of resource providers, wherein analyzing the information about the two or more resource providers includes retrieving real-time location information for the two or more resource providers using global positioning system (GPS) devices associated with the two or more resource providers;
    generating, by the computer system, a feature vector representation of the analyzed information about the two or more of the plurality of resource providers;
    extracting, using the generated feature vector, a resulting confidence score for each of the two or more resource providers;
    setting the confidence score as a closeness index for each of the two or more resource providers, wherein the closeness index indicates a level of closeness between each of the resource providers and a resource recipient;
    grouping, by the computer system, a plurality of people into a group of potential resource collaborators composed of a plurality of group members, wherein the plurality of people is chosen from the plurality of resource providers based upon the information of the plurality of resource providers and the closeness indexes;
    generating, by the computer system, a first potential resource list;

analyzing, by the computer system, a resource providing ability of each of the group members;

selecting, by the computer system and based at least in part upon the resource providing ability of each of the group members, a resource provider chosen from the plurality of group members;

generating, by the computer system, a second potential resource list with detailed information about one or more potential resources on the second potential resource list wherein the one or more potential resources on the second potential resource list are based at least in part on the first potential resource list;

providing, by the computer system, at least a portion of the second potential resource list to the selected resource giver, wherein the portion of the second potential resource list includes at least one resource provision;

receiving an indication of a selected resource from the selected resource giver; and allocating the selected resource to the resource recipient associated with the event.

2. The method of claim 1, wherein:
the resource providing is gift giving;
the resource is a gift;
the resource providers are attendees; and
the providing is giving.

3. The method of claim 2, the method further comprising:
evaluating, by the computer system, a relationship type between each attendee and a gift recipient; and
wherein the grouping of the plurality of people into the group of potential gift collaborators comprises grouping a plurality of attendees into a group of potential gift collaborators based upon their respective relationship types.

4. The method of claim 2, wherein the analyzing of the gift giving ability of each of the group members further comprises:
comparing, by the computer system, one or more gift giving histories of each of the group members;
evaluating, by the computer system, one or more amounts of time available to the group members during which the group members can shop; and identifying, by the computer system, whether one or more group members has expertise regarding one or more items on the first potential gift list.

5. The method of claim 2, wherein selecting of the gift giver further comprises:
ranking, by the computer system, the gift giving ability of each of the group members;
analyzing, by the computer system, one or more locations of the group members; and
comparing, by the computer system, the one or more locations of the group members with one or more locations of shopping sites.

6. The method of claim 2, the method further comprising:
presenting, by the computer system, the first potential gift list to the plurality of group members; and
receiving, by the computer system, a potential gift selection, wherein the potential gift selection is chosen from the first potential gift list.

7. The method of claim 2, wherein the first potential gift list is a list of potential gift categories.

8. The method of claim 7, wherein the one or more potential gifts on the second potential gift list are chosen from one of the potential gift categories.

9. The method of claim 2, wherein the detailed information about the one or more potential gifts includes information selected from the group consisting of: style information, trend information, gift recipient ownership information, gift recipient's social network ownership information, and gift recipient occasions to use information.

10. The method of claim 2, wherein the selecting of the gift giver further comprises:
nominating, by the computer system, a nominated gift giver; and
receiving, by the computer system, an acceptance from the nominated gift giver.

11. The method of claim 2, wherein the identifying of the potential gift giving event further comprises:
determining, by the computer system, that gift giving is appropriate at one of the upcoming events.

12. The method of claim 11, wherein the determining that gift giving is appropriate at one of the upcoming events includes evaluating cultural information within the user data.

* * * * *